(12) United States Patent
Takahashi

(10) Patent No.: US 10,766,999 B2
(45) Date of Patent: Sep. 8, 2020

(54) POLY(AMIDE-IMIDE) RESIN COMPOSITION AND FLUOROCHEMICAL COATING MATERIAL

(71) Applicant: HITACHI CHEMICAL COMPANY, LTD., Tokyo (JP)

(72) Inventor: Atsushi Takahashi, Hitachi (JP)

(73) Assignee: HITACHI CHEMICAL COMPANY, LTD., Tokyo (JP)

(*) Notice: Subject to any disclaimer, the term of this patent is extended or adjusted under 35 U.S.C. 154(b) by 85 days.

(21) Appl. No.: 15/781,201

(22) PCT Filed: Dec. 5, 2016

(86) PCT No.: PCT/JP2016/086025
§ 371 (c)(1),
(2) Date: Jun. 4, 2018

(87) PCT Pub. No.: WO2017/099030
PCT Pub. Date: Jun. 15, 2017

(65) Prior Publication Data
US 2018/0355095 A1 Dec. 13, 2018

(30) Foreign Application Priority Data
Dec. 7, 2015 (JP) .................................. 2015-238556

(51) Int. Cl.
| | |
|---|---|
| *C08G 18/08* | (2006.01) |
| *C08G 18/10* | (2006.01) |
| *C08G 18/34* | (2006.01) |
| *C08G 18/76* | (2006.01) |
| *C08G 18/80* | (2006.01) |
| *C08G 73/10* | (2006.01) |
| *C08G 73/14* | (2006.01) |
| *C08K 3/22* | (2006.01) |
| *C08K 5/357* | (2006.01) |
| *C08L 79/08* | (2006.01) |
| *C09D 7/20* | (2018.01) |
| *C09D 7/40* | (2018.01) |
| *C09D 7/65* | (2018.01) |
| *C09D 179/08* | (2006.01) |
| *C09D 201/04* | (2006.01) |

(52) U.S. Cl.
CPC ..... *C08G 18/8064* (2013.01); *C08G 18/0852* (2013.01); *C08G 18/10* (2013.01); *C08G 18/345* (2013.01); *C08G 18/7671* (2013.01); *C08G 18/8074* (2013.01); *C08G 18/8077* (2013.01); *C08G 73/1035* (2013.01); *C08G 73/14* (2013.01); *C08K 5/357* (2013.01); *C09D 7/20* (2018.01); *C09D 7/40* (2018.01); *C09D 179/08* (2013.01); *C09D 201/04* (2013.01); *C08K 3/22* (2013.01); *C08L 79/08* (2013.01); *C09D 7/65* (2018.01)

(58) Field of Classification Search
CPC .. C08G 18/8064; C08G 18/10; C08G 18/345; C08G 18/7671; C08G 18/0852; C08G 18/8074; C08G 18/8077; C08G 73/1035; C08G 73/14; C08K 3/22; C08K 5/357; C08L 79/08; C09D 7/40; C09D 179/08; C09D 201/04; C09D 7/20; C09D 7/65
See application file for complete search history.

(56) References Cited

U.S. PATENT DOCUMENTS

| | | | |
|---|---|---|---|
| 4,497,944 A | 2/1985 | Nishizawa et al. | |
| 5,798,409 A | * 8/1998 | Ho | C08G 18/10 524/506 |
| 2008/0146764 A1 | 6/2008 | Gertzmann et al. | |
| 2013/0217812 A1 | 8/2013 | Sidenstick et al. | |

FOREIGN PATENT DOCUMENTS

| | | |
|---|---|---|
| CN | 1038968 A | 1/1990 |
| CN | 101578310 A | 11/2009 |
| CN | 104144968 A | 11/2014 |
| JP | 53-57477 A | 5/1978 |
| JP | S58-80326 A | 5/1983 |
| JP | 2-298545 A | 12/1990 |
| JP | 3491624 B2 | 1/2004 |
| JP | 2009-149757 A | 7/2009 |
| JP | 2010-508427 A | 3/2010 |
| JP | 2012-197339 A | 10/2012 |
| JP | 2015-067783 A | 4/2015 |
| JP | 2015-522660 A | 8/2015 |

* cited by examiner

*Primary Examiner* — Patrick D Niland
(74) *Attorney, Agent, or Firm* — Fitch, Even, Tabin & Flannery, LLP

(57) ABSTRACT

A polyamideimide resin composition containing: (A) a polyamideimide resin which has isocyanate groups at the terminals and in which at least a portion of the isocyanate groups are blocked with a blocking agent selected from the group consisting of alcohols, oximes and lactams, (B) N-formylmorpholine, and (C) water.

12 Claims, No Drawings

POLY(AMIDE-IMIDE) RESIN COMPOSITION AND FLUOROCHEMICAL COATING MATERIAL

CROSS-REFERENCE TO RELATED APPLICATIONS

This application is a U.S. national phase application filed under 35 U.S.C. § 371 of International Application No. PCT/JP2016/086025, filed Dec. 5, 2016, designating the United States, which claims priority from Japanese Patent Application No. 2015-238556 filed Dec. 7, 2015, which are hereby incorporated herein by reference in their entirety.

TECHNICAL FIELD

Embodiments of the present invention relate to a polyamideimide resin composition, a method for producing a blocked polyamideimide resin, a fluorochemical coating material, and use of that coating material.

BACKGROUND ART

Polyamideimide resins have excellent heat resistance, chemical resistance and solvent resistance, and are therefore widely used as coating agents for various substrates. For example, polyamideimide resins are used as varnishes for enameled wires and as heat-resistant coating materials and the like.

N-methyl-2-pyrrolidone and the like are well known as the solvents typically used for dissolving, diluting and synthesizing these polyamideimides, and because these solvents are capable of imparting excellent solubility characteristics to polyamideimide resins, they have been widely used up until this point (see Patent Document 1).

Further, in recent years, for reasons including environmental preservation, safety and hygiene, economic viability and coating workability, aqueous resin solutions that use water as the solvent medium instead of an organic solvent are attracting considerable attention. A method for converting a polyamideimide resin to a water-soluble form by reacting a basic compound with the residual carboxyl groups at the resin terminals has been reported (Patent Document 2), and is being used in a variety of applications.

PRIOR ART DOCUMENTS

Patent Documents

Patent Document 1: JP 2012-197339 A
Patent Document 2: JP 3491624 B

SUMMARY OF INVENTION

Problems Invention Aims to Solve

The toxicity (and particularly the reproductive toxicity) of N-methyl-2-pyrrolidone is regarded as a problem in the industrial world, and therefore the development of a synthesis method that uses an organic solvent having low toxicity while exhibiting a similar level of dissolution of polyamideimide resins to that of N-methyl-2-pyrrolidone, and a polyamideimide resin composition containing such an organic solvent would be required.

However, polyamideimide resin varnishes obtained by synthesis in an organic solvent other than N-methyl-2-pyrrolidone tend to exhibit inferior storage stability.

Accordingly, an embodiment of the present invention has an object of providing a polyamideimide resin composition (resin varnish) containing a low-toxicity solvent and having excellent storage stability.

Means for Solution of the Problems

The inventor of the present invention discovered that by using N-formylmorpholine as a solvent (synthesis solvent and coating material solvent), and also using a terminal blocking agent, a polyamideimide resin composition (resin varnish) having excellent storage stability could be obtained.

One embodiment of the present invention relates to a polyamideimide resin composition containing (A) a polyamideimide resin which has isocyanate groups at the terminals and in which at least a portion of the isocyanate groups are blocked with a blocking agent selected from the group consisting of alcohols, oximes and lactams, (B) N-formylmorpholine, and (C) water.

Another embodiment relates to a method for producing a blocked polyamideimide resin, the method including a polymerization step of reacting a diisocyanate compound and a tribasic acid anhydride and/or tribasic acid halide in an organic solvent containing N-formylmorpholine, and a step of blocking the terminal isocyanate groups of the polyamideimide resin with a blocking agent selected from the group consisting of alcohols, oximes and lactams.

Another embodiment relates to a fluorochemical coating material containing the polyamideimide resin composition of the embodiment described above, or a blocked polyamideimide resin produced using the method of the embodiment described above, and a fluororesin.

Yet another embodiment of the present invention relates to a substrate or an article having a coating film formed from the fluorochemical coating material of the embodiment described above on at least a portion of a surface of the substrate or article.

Effects of the Invention

According to an embodiment of the present invention, a water-based polyamideimide resin composition can be provided which contains a solvent of low toxicity and exhibits excellent storage stability. This polyamideimide resin composition can form a coating film having excellent adhesion, and is ideal as a binder for a fluorochemical coating material.

EMBODIMENTS FOR CARRYING OUT THE INVENTION

Preferred embodiments are described below.

1. Polyamideimide Resin Composition

The polyamideimide resin composition is a water-based heat-resistant resin composition containing at least a polyamideimide resin in which the isocyanate terminals are blocked with a blocking agent selected from the group consisting of alcohols, oximes and lactams (namely, a blocked polyamideimide resin), N-formylmorpholine, and water. In this description, the terms "resin composition", "varnish" and "coating material" are sometimes used with the equivqlent meaning.

Polyamideimide Resin

The polyamideimide resin of the component (A) is a resin obtained by reacting a diisocyanate compound with a tribasic acid anhydride or a tribasic acid halide as an acid component. An arbitrary combination of a plurality of compounds may be used for each of these raw material compounds.

There are no particular limitations on the diisocyanate compound, and suitable examples include 4,4'-diphenylmethane diisocyanate, xylylene diisocyanate, 3,3'-diphenylmethane diisocyanate, 3,3'-dimethoxylbiphenyl-4,4'-diisocyanate, para-phenylene diisocyanate, hexamethylene diisocyanate, tolylene diisocyanate, naphthalene diisocyanate and isophorone diisocyanate. From the viewpoint of reactivity, the use of 4,4'-diphenylmethane diisocyanate is preferred.

In one embodiment, the polyamideimide resin may be produced using a diamine compound in addition to the diisocyanate. Examples of the diamine compound include 4,4'-diaminodiphenylmethane, 4,4'-diaminodiphenyl ether 4,4'-diaminodiphenylsulfone, 3,3'-diaminodiphenylsulfone, xylylenediamine, phenylenediamine and isophoronediamine.

Although there are no particular limitations on the tribasic acid anhydride, the use of an aromatic tribasic acid anhydride is preferred, and among such compounds, trimellitic anhydride is preferred. Similarly, there are no particular limitations on the tribasic acid halide, but tribasic acid chlorides, and particularly aromatic tribasic acid chlorides, are preferred, one example of which is trimellitic anhydride chloride (anhydrotrimellitic acid chloride). From the viewpoint of reducing environmental impact, the use of trimellitic anhydride or the like is preferred.

Besides the tribasic acid anhydride (or tribasic acid chloride) described above, other saturated or unsaturated polybasic acids such as dicarboxylic acids and tetracarboxylic dianhydrides may also be used as acid components, provided they do not impair the properties of the polyamideimide resin.

There are no particular limitations on the dicarboxylic acids, and examples include terephthalic acid, isophthalic acid, adipic acid and sebacic acid. There are also no particular limitations on the tetracarboxylic dianhydrides, and examples include pyromellitic dianhydride, benzophenone tetracarboxylic dianhydride and biphenyl tetracarboxylic dianhydride. These compounds may be used individually, or an arbitrary combination of a plurality of compounds may be used.

From the viewpoint of maintaining the properties of the polyamideimide resin, the total amount of carboxylic acids (dicarboxylic acids and tetracarboxylic acids) other than the tribasic acid is preferably within a range from 0 to 50 mol %, and more preferably within a range from 0 to 30 mol %, of all the carboxylic acids.

From the viewpoint of the molecular weight and the crosslinking degree of the produced polyamideimide resin, the usage ratio between the diisocyanate (and diamine) and the acid component (the total of the tribasic acid anhydride or tribasic acid halide, and any dicarboxylic acids and tetracarboxylic dianhydrides that are used as required) is set so that for 1.0 mol of the total of all the acid components, the amount of the diisocyanate compound (and diamine compound) is preferably within a range from 0.8 to 1.1 mol, more preferably from 0.95 to 1.08 mol, and even more preferably from 1.0 to 1.08 mol.

Examples of the alcohol used as the blocking agent (terminal blocking agent) for the terminal isocyanate groups include lower alcohols of 1 to 6 carbon atoms such as methanol, ethanol and propanol. The oxime may be either an aldoxime or a ketoxime, and for example, 2-butanone oxime or the like can be used favorably. Examples of the lactam include δ-valerolactam and ε-caprolactam. The blocking agent is not limited to the compounds listed above, and a plurality of types of blocking agent or a plurality of compounds of a single type may also be used.

From the viewpoint of ensuring favorable coating film strength, the number average molecular weight of the polyamideimide resin is preferably at least 5,000, more preferably at least 10,000, and even more preferably 15,000 or greater. On the other hand, in order to ensure satisfactory solubility in water, the number average molecular weight is preferably not more than 50,000, more preferably not more than 30,000, and even more preferably 25,000 or less.

The number average molecular weight of the polyamideimide resin can be controlled within the above preferred range by performing sampling during the resin synthesis, measuring the molecular weight by gel permeation chromatography (GPC) using a calibration curve prepared using standard polystyrenes, and continuing the synthesis until the targeted number average molecular weight has been achieved. Measurement conditions for the GPC are described below.

The polyamideimide resin preferably has an acid value, composed of a combination of the carboxyl groups in the resin and other carboxyl groups formed as a result of ring-opening of acid anhydride groups, within a range from 10 to 80 mgKOH/g. Provided this acid value is at least 10 mgKOH/g, dissolution or dispersion of the resin in the solvent becomes easier, the amount of carboxyl groups is sufficient for reaction with a basic compound, and the resin tends to be more easily converted to a water-soluble form. On the other hand, provided the acid value is not more than 80 mgKOH/g, the final polyamideimide resin composition tends to be less likely to gel upon storage. From these viewpoints, the acid value is more preferably at least 25 mgKOH/g, but is also more preferably not more than 60 mgKOH/g, and even more preferably 40 mgKOH/g or less.

The acid value can be obtained using the following method. First, about 0.5 g of the polyamideimide resin composition is sampled, about 0.15 g of 1,4-diazabicyclo[2.2.2]octane is added to the sample, about 60 g of N-methyl-2-pyrrolidone and about 1 ml of ion-exchanged water are then added, and the resulting mixture is stirred until the polyamideimide resin dissolves completely. This solution is then titrated against a 0.05 mol/L ethanolic potassium hydroxide solution using a potentiometric titrator to obtain the acid value for the polyamideimide resin, representing the combination of carboxyl groups and those carboxyl groups formed as a result of ring-opening of acid anhydride groups.

The amount of the polyamideimide resin in the composition may be set appropriately in accordance with the intended application, and although there are no particular limitations on the amount, from the viewpoint of achieving balance with the other components, in one preferred embodiment, the amount of the polyamideimide resin within the composition is preferably at least 5% by mass, more preferably at least 10% by mass, and even more preferably 15% by mass or greater, but is preferably not more than 50% by mass, more preferably not more than 40% by mass, and even more preferably 30% by mass or less.

N-formylmorpholine

The polyamideimide resin composition contains the N-formylmorpholine of the component (B) as an organic solvent.

The polyamideimide resin composition may also contain other organic solvents besides the N-formylmorpholine.

Examples of these other solvents include one or more polar solvents selected from among N-methyl-2-pyrrolidone, N-ethyl-2-pyrrolidone, γ-butyrolactone, dimethyl sulfoxide, 1,3-dimethyl-2-imidazolidine, dimethylacetamide, dimethylformamide, and N-acetylmorpholine and the like. In addition, one or more co-solvents may also be used, including ether compounds such as anisole, diethyl ether and ethylene glycol, ketone compounds such as acetophenone, methyl ethyl ketone, methyl isobutyl ketone, cyclohexanone and cyclopentanone, aromatic hydrocarbon solvents such as xylene and toluene, and alcohols such as ethanol and 2-propanol.

In terms of the miscibility with water, the amount of N-formylmorpholine, or the amount of the organic mixed solvent containing N-formylmorpholine, is preferably not more than 90% by mass, and more preferably 80% by mass or less, within the combination of the solvent and water (namely, relative to the total mass of solvent). In the case of an organic mixed solvent, in order to ensure satisfactory manifestation of the effects of a preferred embodiment, the amount of N-formylmorpholine within the organic mixed solvent is preferably at least 50% by mass, and more preferably 80% by mass or greater.

Water

The polyamideimide resin composition also contains the water of the component (C). Ion-exchanged water can be used favorably as the water.

From the viewpoint of improving the solubility of the polyamideimide resin in the water, the amount of the water is preferably at least 10% by mass of the composition, more preferably at least 15% by mass, and even more preferably at least 25% by mass, but on the other hand, the amount of water is preferably not more than 80% by mass of the composition, more preferably not more than 70% by mass, and even more preferably 60% by mass or less. Further, relative to the combination of the organic solvent containing the N-formylmorpholine and water, namely relative to the total mass of all solvent in the composition, the amount of water is preferably at least 10% by mass (a ratio to solvent of at least 10% by mass), more preferably at least 20% by mass, and even more preferably at least 25% by mass, but on the other hand, the water ratio to solvent is preferably not more than 90% by mass, and more preferably 50% by mass or lower.

Other Components

In addition to the components (A) to (C) described above, the polyamideimide resin composition according to one embodiment may also contain one or more optional components in accordance with the intended use. This composition may also partially contain a polyamideimide resin other than the specific blocked polyamideimide resin described above.

In a preferred embodiment, in order to enhance the solubility of the polyamideimide resin in water, the composition also contains a basic compound. The basic compound enhances the solubility of the resin in water by reacting with the carboxyl groups in the polyamideimide resin to form salts.

Examples of suitable basic compounds include:

alkylamines such as triethylamine, tributylamine, N,N-dimethylcyclohexylamine, N,N-dimethylbenzylamine, triethylenediamine, N-methylmorpholine, N,N,N',N'-tetramethylethylenediamine, N,N,N',N'',N''-pentamethyldiethylenetriamine, N,N',N'-trimethylaminoethylpiperazine, diethylamine, diisopropylamine, dibutylamine, ethylamine, isopropylamine and butylamine; and alkanolamines such as monoethanolamine, diethanolamine, triethanolamine, dipropanolamine, tripropanolamine, N-ethylethanolamine, N,N-dimethylethanolamine, N,N-diethylethanolamine, cyclohexanolamine, N-methylcyclohexanolamine and N-benzylethanolamine.

Besides the basic compounds mentioned above, caustic alkalis such as sodium hydroxide and potassium hydroxide, or ammonia water or the like may also be used in combination with the above basic compounds.

From the viewpoints of facilitating the conversion of the resin to a water-soluble form and improving the coating film strength, the basic compound is preferably used in an amount of 2.5 to 10 equivalents, and more preferably at least 4 equivalents but not more than 8 equivalents, relative to the acid value of the combination of carboxyl groups and ring-opened acid anhydride groups within the polyamideimide resin.

The salt formation between the polyamideimide resin and the basic compound may be achieved by adding the basic compound to the polyamideimide resin composition containing water, or by adding the basic compound to an organic solvent solution of the polyamideimide resin that contains no water, and subsequently adding water. The temperature during salt formation is preferably within a range from 0° C. to 200° C., and more preferably from 40° C. to 130° C.

The polyamideimide resin composition is preferably used as a coating material. In order to enable the resin composition to be used favorably as a coating material, optional components such as pigments, fillers, antifoaming agents, preservatives and surfactants may be added as required. Resins other than the polyamideimide resin may also be included, and details of such resins are disclosed below in the section relating to coating materials.

2. Method for Producing Blocked Polyamideimide Resin

The method for producing a blocked polyamideimide resin includes:

a polymerization step of reacting a diisocyanate compound and a tribasic acid anhydride and/or tribasic acid halide in an organic solvent containing N-formylmorpholine, and a step of blocking the terminal isocyanate groups of the polyamideimide resin with a blocking agent selected from the group consisting of alcohols, oximes and lactams.

The raw material compounds used are as described above in the section relating to the polyamideimide resin composition. Further, as described below, although the polymerization step and the blocking step may be performed as separate steps, the two steps may also be performed at one time, so that the polymerization and the blocking occur at one time.

In the polymerization step, N-formylmorpholine or an organic solvent containing N-formylmorpholine can be used as the polymerization solvent (synthesis solvent), and in such cases, the obtained polymerization solution may be used without further modification as the polyamideimide resin composition, for use as a coating material or the like. In other words, N-formylmorpholine may be used as both the synthesis solvent and the coating material solvent described below. Organic solvents other than N-formylmorpholine are as described above in the section relating to the polyamideimide resin composition.

Although there are no particular limitations on the amount of solvent used during the polymerization, using an amount of solvent of 50 to 500 parts by mass per 100 parts by mass of the total mass of the diisocyanate component (and diamine component) and the acid component is preferred from the viewpoint of the solubility of the obtained resin.

Although there are no particular limitations on the reaction temperature, a temperature of 80 to 180° C. is generally preferred.

In order to reduce the effect of moisture in the air, the polymerization reaction is preferably conducted under an atmosphere of nitrogen or the like.

The polyamideimide resin can, for example, be produced using any of the following procedures.

(1) A method of synthesizing the polyamideimide resin by using and reacting the acid component and the diisocyanate component (and diamine component) in a single batch.

(2) A method of reacting the acid component with an excess of the diisocyanate component (and diamine component) to synthesize an amideimide oligomer having isocyanate groups or amino groups at the terminals, and then synthesizing the polyamideimide resin by adding additional acid component to react with the terminal isocyanate groups (and amino groups).

(3) A method of reacting an excess of the acid component with the diisocyanate component (and diamine component) to synthesize an amideimide oligomer having acid groups or acid anhydride groups at the terminals, and then synthesizing the polyamideimide resin by adding additional diisocyanate component and/or diamine component to react with the terminal acid groups and/or acid anhydride groups.

The blocking step may be performed by reacting the blocking agent during the synthesis of the resin, so that the above polymerization step and blocking step occur at one time, or the blocking agent may be reacted with the resin after the polymerization step. In the former case, the blocking agent is typically added to the polymerization solvent.

If the total amount of diisocyanate used during the resin production is deemed to be 100 parts by mass, then the amount of the terminal blocking agent added during blocking is preferably from 1.0 to 10.0 parts by mass, and from the viewpoint of the storage stability of the obtained resin composition, is more preferably from 2.5 to 5.0 parts by mass.

3. Method for Producing Polyamideimide Resin Composition

The polyamideimide resin composition of a preferred embodiment, containing the aforementioned blocked polyamideimide resin (A), N-formylmorpholine (B), and water (C), can be produced favorably by adding water to the reaction solution containing the polyamideimide resin obtained using the method for producing a blocked polyamideimide resin described above.

In other words, the method for producing a polyamideimide resin composition includes the following steps.

Namely, the method includes a polymerization step of reacting a diisocyanate compound and a tribasic acid anhydride and/or tribasic acid halide in an organic solvent containing N-formylmorpholine, a step of blocking the terminal isocyanate groups of the polyamideimide resin with a blocking agent selected from the group consisting of alcohols, oximes and lactams, and a step of adding water to the obtained resin solution.

4. Coating Material

The polyamideimide resin composition can be diluted with water to any arbitrary concentration, and can form a coating film that exhibits excellent adhesion to substrates even after high-temperature firing, and is therefore preferably used as a coating material. When the polyamideimide resin composition is used as a coating material, the composition may be appropriately diluted with water or an organic solvent to obtain a suitable viscosity that is appropriate for the coating film formation method or the like.

Further, because this polyamideimide resin composition also exhibits excellent miscibility with fluororesin water dispersions, it can be used favorably as a fluororesin binder. In other words, the polyamideimide resin composition can be used favorably as a fluorochemical coating material into which a fluororesin has been mixed.

A fluorochemical coating material containing a fluororesin and either the polyamideimide resin composition or a polyamideimide resin obtained using the above method for producing a blocked polyamideimide resin exhibits excellent coating film adhesion, heat resistance and hardness, and is therefore ideal as a coating material for household electrical appliances or kitchen utensils.

This fluorochemical coating material designed for household electrical appliances or kitchen utensils is composed of a mixed system containing a fluororesin that generates non-tacky properties, and a polyamideimide resin that generates good adhesion to substrates, and in order to ensure that the fluororesin orients toward the coating film surface during coating film firing, high-temperature firing at a temperature in the vicinity of 400° C. is performed to melt the fluororesin.

The blocked polyamideimide resin described above is preferably included within the coating material in an amount of 1 to 50% by mass in order to ensure satisfactory manifestation of the resin functions. A plurality of different types of blocked polyamideimide resins may be combined, and a portion of an unblocked polyamideimide resin may also be included.

Fluororesin

The properties required of the mixed fluororesin include non-tackiness, corrosion resistance, heat resistance and chemical resistance, and examples of fluororesins that can be used favorably include mainly tetrafluoroethylene resins, tetrafluoroethylene-perfluoro vinyl ether copolymers, and tetrafluoroethylene-hexafluoropropylene copolymers. A combination of a plurality of these resins may also be used.

There are no particular limitations on the form of the fluororesin, and either an aqueous dispersion or a powder may be used. Although there are no particular limitations on the amount added of the fluororesin, in order to obtain a coating film having a good balance between superior adhesion and non-tackiness and the like, the amount of the fluororesin is preferably from 50 to 800 parts by mass, and more preferably from 100 to 500 parts by mass, per 100 parts by mass of the polyamideimide resin.

Other Components

If necessary, the coating material or the fluorochemical coating material may also use one or more polyethersulfone resins (PES), polyimide resins (PI), polyamide resins, epoxy compounds, isocyanate compounds, or melamine compounds or the like.

In one preferred embodiment, the coating material may contain an epoxy compound (epoxy resin). By adding an epoxy compound, the thermal, mechanical and electrical properties of the polyamideimide resin can be further improved. Further, epoxy compounds (epoxy resins), melamine compounds (melamine resins) and isocyanate compounds are preferred, as they enable further improvement in the adhesion of the coating film.

Examples of the epoxy compounds include bisphenol epoxy resins (such as bisphenol-A epoxy resins, hydrogenated bisphenol-A epoxy resins, bisphenol-F epoxy resins, brominated bisphenol-A epoxy resins, and bisphenol-S epoxy resins), biphenyl epoxy resins, phenol novolac epoxy resins, brominated phenol novolac epoxy resins, o-cresol novolac epoxy resins, flexible epoxy resins, polyfunctional epoxy resins, amine epoxy resins, heterocyclic ring-containing epoxy resins, alicyclic epoxy resins, triglycidyl isocyanurate, and bixylenol epoxy resins. These epoxy compounds may be used individually, or a plurality of compounds may be combined.

The epoxy compound may be added alone and reacted with the polyamideimide resin, but the epoxy compound may also be added together with a curing agent or a curing accelerator so that residual unreacted epoxy compound is not retained after curing.

Examples of the isocyanate compounds include polyisocyanates of hexamethylene diisocyanate such as Duranate, and polyisocyanates synthesized from 4,4'-diphenylmethane diisocyanate. The weight average molecular weight of these polyisocyanates is preferably from 500 to 9,000, and more preferably from 1,000 to 5,000.

There are no particular limitations on the melamine compounds, and examples include methylol group-containing compounds obtained by reacting melamine with formaldehyde or para-formaldehyde or the like. These methylol groups are preferably etherified with an alcohol having 1 to 6 carbon atoms.

In terms of the amount of these epoxy compounds, isocyanate compounds and melamine compounds included in the coating material, the amount of each of these compounds per 100 parts by mass of the polyamideimide resin is preferably at least 1 part by mass, and more preferably at least 5 parts by mass in terms of achieving a satisfactory improvement in the adhesion, but is preferably not more than 40 parts by mass, and more preferably 30 parts by mass or less from the viewpoint of maintaining the heat resistance and strength of the polyamideimide resin composition.

The coating material preferably also includes a surfactant depending on need. Although there are no particular limitations on the surfactant, a surfactant which ensures that the coating material composition mixes uniformly and does not undergo layer separation or phase separation before the coating film dries, and which does not leave a large amount of residual matter following firing, is preferred.

Although there are no particular limitations on the amount of the surfactant, in order to maintain a uniform mixed state for the coating material composition, and ensure that a large amount of residual surfactant is not retained after firing so as not to adversely affect the film formation properties, the amount of the surfactant is preferably from 0.01 to 10% by mass, and more preferably from 0.5 to 5% by mass, of the mass of the coating material.

In order to improve the water resistance and the like of the coating film, the coating material may also contain a filler. The type of filler used can be selected in accordance with the intended application of the coating film, with due consideration of factors such as the water resistance and the chemical resistance of the filler, and is preferably a filler that does not dissolve in water. Specific examples of the filler include metal powders, metal oxides (such as aluminum oxide, zinc oxide, tin oxide and titanium oxide), glass beads, glass flakes, glass particles, ceramics, silicon carbide, silicon oxide, calcium fluoride, carbon black, graphite, mica and barium sulfate. Any of these fillers may be used individually, or a combination of a plurality of fillers may be used.

There are no particular limitations on the coating method used for the coating material, and conventional coating methods such as dip coating, spray coating and brush application can be employed. The volume of solvent is preferably adjusted appropriately, with the concentration diluted to a level that is appropriate for the coating method.

Following application of the coating material, the material is dried (preliminary drying) and cured (firing) to form a coating film. The conditions for the drying and curing are not particularly limited, and are preferably set appropriately in accordance with the heat resistance and the like of the substrate being used. In order to ensure favorable adhesion and toughness for the coating film, heating is preferably performed at 250° C. or higher. In the case of a fluorochemical coating material, in order to ensure that the fluororesin orients toward the coating film surface during coating film firing, a high-temperature firing at a temperature in the vicinity of 400° C. is preferably conducted to melt the fluororesin, and performing the firing at a temperature of 330° C. to 420° C. for a period of about 10 minutes to 30 minutes is preferred. As a result of the firing, the fluororesin migrates toward the coating film surface, and melts to form a film.

5. Substrate or Article

A substrate or article of an embodiment of the present invention has a coating film formed from the above fluorochemical coating material on at least a portion of a surface of the substrate or article.

The coating film can be formed on the surface of any type of substrate or article in which good safety properties and boiling resistance and the like are required for the coating film. The surface on which the coating film is formed is preferably a surface that is exposed to water vapor and/or a surface that is exposed to high temperatures.

Examples of the article include household electrical cooking appliances and kitchen utensils and the like. Examples of the kitchen utensils include utensils for which there is a possibility of contact with boiling water or steam, such as pots, pressure cookers and fry pans, and more specifically, pots, pressure cookers and fry pans having the coating film described above formed on the inside surface, and lids for these utensils. Further, specific examples of the household electrical cooking appliances (kitchen electrical appliances) include rice cookers, hot plates, electric kettles, microwave ovens, oven ranges and gas ranges, and more specifically, inner pots and lids of rice cookers having the coating film described above formed on the inside surfaces thereof, microwave ovens having the coating film formed on the interior surface of the oven, and the top plates of gas ranges having the coating film formed on the surface.

The substrate is preferably a substrate that is used in these types of household electrical cooking appliances and kitchen utensils.

The polyamideimide resin composition according to an embodiment of the present invention, and a coating material (such as a fluorochemical coating material) containing this polyamideimide resin as a coating film component have low toxicity and excellent storage stability, and when applied to a target article and then cured, are able to form a coating film which, compared with conventional coating films, exhibits excellent adhesion to the substrate and excellent steam resistance even after high-temperature firing. Accordingly, the present invention has enormous benefits in a large variety of applications that require safety, boiling resistance or steam resistance, and heat resistance for surface coating films, including household electrical appliances and cooking utensils.

In addition, because this polyamideimide resin composition is a water-based resin composition, the environmental impact can be reduced, and a contribution can also be made to VOC reduction.

Although the above description has provided detailed descriptions of coating materials and fluorochemical coating materials, the polyamideimide resin composition can also be mixed with other resin materials or the like, and used to produce molded items by molding methods such as extrusion molding.

EXAMPLES

A variety of examples are described below, but the preferred embodiments of the invention are not limited to these examples, and of course also incorporate many embodiments other than these examples based on the scope of the present invention.

Example 1

First, 322.8 g of trimellitic anhydride, 423.5 g of 4,4'-diphenylmethane diisocyanate and 829.8 g of N-formylmorpholine were placed in a flask fitted with a thermometer, a stirrer and a condenser, and the temperature was gradually raised to 120° C. while stirring for 2 hours under a stream of dry nitrogen. The temperature was then held at 120° C. while particular care was taken over the rapid foaming of carbon dioxide gas that was generated by the reaction, and after continued heating at this temperature for 6 hours, the reaction was halted, and 21.2 g of ethanol (5.0 parts by mass per 100 parts by mass of diisocyanate) was mixed as a terminal blocking agent, thus obtaining a polyamideimide resin solution.

The non-volatile fraction (200° C., 2 hours) of this polyamideimide resin solution was 45% by mass. Further, the number average molecular weight of the polyamideimide resin was 15,000, and the acid value composed of a combination of carboxyl groups and other carboxyl groups formed as a result of ring-opening of acid anhydride groups was 45 mgKOH/g.

The number average molecular weight of the polyamideimide resin was measured under the following conditions.
  GPC apparatus: Hitachi L6000
  Detector: Hitachi L4000 UV
  Wavelength: 270 nm
  Data processing unit: ATT 8
  Columns: Gelpack GL-S300MDT-5×2
  Column size: 8 mmø×300 mm
  Solvent: DMF/THF=1/1 (liter)+0.06 M phosphoric acid+0.06 M lithium bromide
  Sample concentration: 5 mg/ml
  Injection volume: 5 μl
  Pressure: 49 kgf/cm² (4.8×10⁶ Pa)
  Flow rate: 1.0 ml/min Subsequently, 1,200 g of the thus obtained polyamideimide resin solution was placed in a flask fitted with a thermometer, a stirrer and a condenser, and the temperature was gradually raised to 70° C. while stirring under a stream of dry nitrogen. When the temperature reached 70° C., 154.4 g (4 equivalents) of N,N-dimethylethanolamine was added, and following thorough stirring with the temperature maintained at 70° C., ion-exchanged water was added gradually to the flask under constant stirring. The ion-exchanged water was added until a final total of 660.0 g of water (solvent ratio: 50% by mass) had been added, thus obtaining a transparent and uniform polyamideimide resin composition (water-based heat-resistant resin composition).

Example 2

First, 960.6 g of trimellitic anhydride, 1,257.2 g of 4,4'-diphenylmethane diisocyanate and 2,338.9 g of N-formylmorpholine were placed in a flask fitted with a thermometer, a stirrer and a condenser, and the temperature was gradually raised to 90° C. while stirring for one hour under a stream of dry nitrogen. The temperature was then held at 90° C. while particular care was taken over the rapid foaming of carbon dioxide gas that was generated by the reaction, and after continuing heating at this temperature for 8 hours from the start of heating, the reaction was halted, and 31.4 g of methanol (2.5 parts by mass per 100 parts by mass of diisocyanate) was mixed as a terminal blocking agent, thus obtaining a polyamideimide resin solution.

The non-volatile fraction (200° C., 2 hours) of this polyamideimide resin solution was 47% by mass. Further, the number average molecular weight of the polyamideimide resin was 10,000, and the acid value composed of a combination of carboxyl groups and other carboxyl groups formed as a result of ring-opening of acid anhydride groups was 60 mgKOH/g.

Subsequently, 3,200 g of the thus obtained polyamideimide resin solution was placed in a flask fitted with a thermometer, a stirrer and a condenser, and the temperature was gradually raised to 80° C. while stirring under a stream of dry nitrogen. When the temperature reached 80° C., 358.5 g (2.5 equivalents) of N,N-dimethylethanolamine was added, and following thorough stirring with the temperature maintained at 80° C., ion-exchanged water was added gradually to the flask under constant stirring. The ion-exchanged water was added until a final total of 1696.0 g of water (solvent ratio: 50% by mass) had been added, thus obtaining a transparent and uniform polyamideimide resin composition (water-based heat-resistant resin composition).

Example 3

First, 576.4 g of trimellitic anhydride, 768.3 g of 4,4'-diphenylmethane diisocyanate and 1,636.2 g of N-formylmorpholine were placed in a flask fitted with a thermometer, a stirrer and a condenser, and the temperature was gradually raised to 120° C. while stirring for one hour under a stream of dry nitrogen. The temperature was then raised gradually to 140° C. while particular care was taken over the rapid foaming of carbon dioxide gas that was generated by the reaction, and after continuing heating at this temperature for 5 hours from the start of heating, the reaction was halted, and 19.2 g of ε-caprolactam (2.5 parts by mass per 100 parts by mass of diisocyanate) was mixed as a terminal blocking agent, thus obtaining a polyamideimide resin solution.

The non-volatile fraction (200° C., 2 hours) of this polyamideimide resin solution was 42% by mass. Further, the number average molecular weight of the polyamideimide resin was 25,000, and the acid value composed of a combination of carboxyl groups and acid anhydride groups was 25 mgKOH/g.

Subsequently, 2,000 g of the thus obtained polyamideimide resin solution was placed in a flask fitted with a thermometer, a stirrer and a condenser, and the temperature was gradually raised to 60° C. while stirring under a stream of dry nitrogen. When the temperature reached 60° C., 266.9 g (8 equivalents) of N,N-dimethylethanolamine was added, and following thorough stirring with the temperature maintained at 60° C., ion-exchanged water was added gradually to the flask under constant stirring. The ion-exchanged water was added until a final total of 386.7 g of water (solvent ratio: 25% by mass) had been added, thus obtaining a transparent and uniform polyamideimide resin composition (water-based heat-resistant resin composition).

Comparative Example 1

First, 1,106.2 g of trimellitic anhydride, 1,455.8 g of 4,4-diphenylmethane diisocyanate and 2,562.0 g of N-formylmorpholine were placed in a flask fitted with a thermometer, a stirrer and a condenser, and the temperature was gradually raised to 130° C. while stirring for two hours under a stream of dry nitrogen. The temperature was then held at 130° C. while particular care was taken over the rapid foaming of carbon dioxide gas that was generated by the reaction, and after continued heating at this temperature for 6 hours, the reaction was halted, thus obtaining a polyamideimide resin solution.

The non-volatile fraction (200° C., 2 hours) of this polyamideimide resin solution was 50% by mass. Further, the number average molecular weight of the polyamideimide resin was 17,000, and the acid value composed of a combination of carboxyl groups and other carboxyl groups formed as a result of ring-opening of acid anhydride groups was 40 mgKOH/g.

Subsequently, 2,700 g of the thus obtained polyamideimide resin solution was placed in a flask fitted with a thermometer, a stirrer and a condenser, and the temperature was gradually raised to 50° C. while stirring under a stream of dry nitrogen. When the temperature reached 50° C., 343.2 g (4 equivalents) of N,N-dimethylethanolamine was added, and following thorough stirring with the temperature maintained at 50° C., ion-exchanged water was added gradually to the flask under constant stirring. The ion-exchanged water was added until a final total of 1,350.0 g of water (solvent ratio: 50% by mass) had been added, thus obtaining a transparent and uniform polyamideimide resin composition (water-based heat-resistant resin composition).

Evaluations

Each of the polyamideimide resin compositions (varnishes) obtained in the above examples and comparative examples was stored in an environment at 60° C., and the external appearance of the varnish was inspected after 7 days.

Further, each of the resin compositions (test coating materials) was applied to an aluminum substrate (1×50×150 mm, manufactured by Paltec Test Panels Co., Ltd.), and an adhesion test was performed in the manner described below.

Specifically, each of the above substrates to which a test coating material had been applied was subjected to preliminary drying at 80° C. for 10 minutes, and was then fired at 400° C. for 10 minutes, thus obtaining a coating film having an average film thickness of 10 μm across 5 locations. Cuts were then formed in this coating film to generate 1 mm squares in a 10×10 pattern, an adhesive tape (manufactured by Nichiban Co., Ltd.) was adhered to, and then peeled from, the surface, which was repeated 5 times, and the number of remaining squares was counted.

The test results are shown in Table 1.

TABLE 1

| | Item | Example 1 | Example 2 | Example 3 | Comparative Example 1 |
|---|---|---|---|---|---|
| Polyamideimide resin | Polymerization solvent | | N-formylmorpholine | | |
| | Number average molecular weight | 15,000 | 10,000 | 25,000 | 17,000 |
| | Acid value (mgKOH/g) | 45 | 60 | 25 | 40 |
| Water | Solvent ratio (% by mass) | 50 | 50 | 25 | 50 |
| Evaluation results | External appearance after storage at 60° C. for 7 days | transparent | transparent | transparent | cloudy |
| | Adhesion | 100 | 100 | 100 | 100 |

As shown in Table 1, compared with the polyamideimide resin composition of the comparative example in which blocking of the polyamideimide resin terminals was not performed, the polyamideimide resin compositions obtained in the examples exhibited superior storage stability. Further, using N-formylmorpholine as the coating material solvent enabled the formation of a polyamideimide resin coating film that exhibited excellent adhesion.

This Application is related to the subject matter disclosed in prior Japanese Application 2015-238556 filed on Dec. 7, 2015, the entire contents of which are incorporated by reference herein.

It should be noted that, in addition to the embodiments already described, various modifications and alterations may be made to these embodiments without departing from the novel advantageous features of the present invention. Accordingly, it is intended that all such modifications and alterations are included within the scope of the appended claims.

The invention claimed is:

1. A fluorochemical coating material comprising a fluororesin and a polyamideimide resin composition comprising: (A) a polyamideimide resin which has isocyanate groups at terminals and in which at least a portion of the isocyanate groups are blocked with a blocking agent selected from the group consisting of alcohols, oximes and lactams, (B) N-formylmorpholine, and (C) water.

2. The fluorochemical coating material according to claim 1, wherein a number average molecular weight of the polyamideimide resin (A) is from 5,000 to 50,000.

3. The fluorochemical coating material according to claim 1, wherein an acid value of the polyamideimide resin (A), composed of a combination of carboxyl groups and other carboxyl groups formed as a result of ring-opening of acid anhydride groups, is from 10 to 80 mgKOH/g.

4. The fluorochemical coating material according claim 1, wherein an amount of the water (C) is at least 10% by mass relative to a total mass of the composition.

5. A substrate having a coating film formed from the fluorochemical coating according to claim 1 on at least a portion of a surface of the substrate.

6. An article having a coating film formed from the fluorochemical coating according to claim 1 on at least a portion of a surface of the article.

7. A fluorochemical coating material comprising a blocked polyamideimide resin and a fluororesin, the blocked polyamideimide resin being produced using a method comprising:
  reacting a diisocyanate compound and a tribasic acid anhydride and/or tribasic acid halide in an organic solvent containing N-formylmorpholine to produce a polyamideimide resin, and
  blocking terminal isocyanate groups of the polyamideimide resin with a blocking agent selected from the group consisting of alcohols, oximes and lactams.

8. A substrate having a coating film formed from the fluorochemical coating material according to claim 7 on at least a portion of a surface of the substrate.

9. An article having a coating film formed from the fluorochemical coating material according to claim 7 on at least a portion of a surface of the article.

10. An article having a coating film formed from the fluorochemical coating according to claim 2 on at least a portion of a surface of the article.

11. An article having a coating film formed from the fluorochemical coating according to claim 3 on at least a portion of a surface of the article.

12. An article having a coating film formed from the fluorochemical coating according to claim 4 on at least a portion of a surface of the article.

* * * * *